(12) United States Patent
Deshpande et al.

(10) Patent No.: US 12,086,848 B1
(45) Date of Patent: Sep. 10, 2024

(54) COST-AWARE TIERING FOR DATA STORAGE

(71) Applicant: INTERNATIONAL BUSINESS MACHINES CORPORATION, Armonk, NY (US)

(72) Inventors: Umesh Deshpande, San Jose, CA (US); Paul Henri Muench, San Jose, CA (US); Robert Michael Rees, Los Gatos, CA (US); Thanh T. Pham, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/180,459

(22) Filed: Mar. 8, 2023

(51) Int. Cl.
*G06F 12/00* (2006.01)
*G06F 3/06* (2006.01)
(Continued)

(52) U.S. Cl.
CPC ....... *G06Q 30/0283* (2013.01); *G06F 3/0649* (2013.01); *G06F 3/067* (2013.01); *G06Q 30/04* (2013.01); *G06F 3/0604* (2013.01)

(58) Field of Classification Search
CPC ...... G06F 3/0685; G06F 3/0608; G06F 3/067; G06F 11/1435; G06F 11/1451; G06F 11/1461; G06F 11/1469; G06F 11/1471; G06F 12/0253; G06F 2201/84; G06F 2212/1044; G06F 3/0604; G06F 3/0605;
(Continued)

(56) References Cited

U.S. PATENT DOCUMENTS 8,380,947 B2   2/2013   Chiu
9,632,707 B2   4/2017   Hyde, II
(Continued)

FOREIGN PATENT DOCUMENTS

CN   109358821 A   2/2019

OTHER PUBLICATIONS

Cheng, et al., "Optimizing Data Placement on Hierarchical Storage Architecture via Machine Learning," In: Tang, et al. (eds), Network and Parallel Computing (NPC 2019), Lecture Notes in Computer Science, vol. 11783, Sep. 29, 2019, Springer, Cham., pp. 289-302, https://doi.org/10.1007/978-3-030-30709-7_23.
(Continued)

*Primary Examiner* — Yong J Choe
(74) *Attorney, Agent, or Firm* — L. Jeffrey Kelly

(57) ABSTRACT

An embodiment for a method of cost-aware tiering for data storage. The embodiment may detect data to be stored in one or more storage systems and gathering access and usage information. The embodiment may maintain a first data structure including periods of activity below a defined threshold for the detected data, and a common data structure to identify and track application-wide data patterns. The embodiment may gather static pricing information and context pricing information for the one or more storage systems and calculate a tiering threshold corresponding to a continuous period of activity below a second defined threshold required for which local storage costs exceed a tiering cost. The embodiment may calculate for inactive data segments, probabilities of the inactive data segments remaining inactive for a duration that exceeds the calculated tiering threshold. The embodiment may calculate a risk score and generate a tiering list for storing the data.

20 Claims, 3 Drawing Sheets

(51) Int. Cl.
*G06F 12/02* (2006.01)
*G06Q 30/0283* (2023.01)
*G06Q 30/04* (2012.01)

(58) Field of Classification Search
CPC ...... G06F 3/061; G06F 3/0611; G06F 3/0617; G06F 3/0626; G06F 3/0631; G06F 3/064; G06F 3/0641; G06F 3/0647; G06F 3/0649; G06F 3/065; G06F 3/0652; G06F 3/0653; G06F 3/0665; G06F 3/0689
See application file for complete search history.

(56) References Cited

U.S. PATENT DOCUMENTS 10,862,967 B2   12/2020   Brunk
11,288,129 B2    3/2022   Wang
11,392,868 B1    7/2022   Malamut

OTHER PUBLICATIONS

Disclosed Anonymously, "A Method for Auto Storage Tiering on Cloud Storage Virtualization Appliance," IP.com, IPCOM000260301D, Nov. 11, 2019, 4 pages.

Disclosed Anonymously, "Storage Tiering Based on Performance and Cost Constraints," IP.com, IPCOM000253119D, Mar. 6, 2018, 3 pages.

Hou, et al., "GDS-LC: A Latency and Cost Aware Client Caching Scheme for Cloud Storage," ACM Trans. Storage 13, 4, Article 1, Jan. 2017, ACM, pp. 1-34.

Irie, et al., A Novel Automated Tiered Storage Architecture for Achieving Both Cost Saving and QoE, 2018 IEEE 8th International Symposium on Cloud and Service Computing (SC2), Downloaded on Mar. 8, 2023 from IEEE Xplore, pp. 32-40.

Mansouri, et al., "Cost Optimization Algorithms for Hot and Cool Tiers Cloud Storage Services," 2018 IEEE 11th International Conference on Cloud Computing (CLOUD), Downloaded on Oct. 28, 2022 from IEEE Xplore, pp. 622-629.

COST-AWARE TIERING FOR DATA STORAGE

BACKGROUND

The present application relates generally to data storage, and more particularly, to cost-aware tiering for data storage.

Many businesses must manage rapidly expanding volumes of data as computing power continues to increase over time. There are often multiple options for storing data, each having unique price points based on a variety of factors. To lower costs, many businesses attempt to employ hierarchical data storage solutions such that individual data segments may be stored within a suitably priced storage option depending on the importance of each individual data segment.

SUMMARY

According to one embodiment, a method, computer system, and computer program product for cost-aware tiering for data storage is provided. The embodiment may include detecting data to be stored in one or more storage systems and gathering access and usage information for each data segment in the detected data. The embodiment may further include generating and maintaining a first data structure, the first data structure including periods of activity below a defined threshold for the detected data. The embodiment may also include generating and maintaining a common data structure to identify and track application-wide data patterns. The embodiment may further include gathering static pricing information and context pricing information for the one or more storage systems. The embodiment may also include calculating a tiering threshold corresponding to a continuous period of activity below a second defined threshold required for which local storage costs exceed a tiering cost. The embodiment may further include identifying inactive data segments within the detected data and calculating, for each of the identified inactive data segments, probabilities of the inactive data segments remaining inactive for a duration that exceeds the calculated tiering threshold. The embodiment may also include calculating a risk score for each of the identified inactive data segments based on the calculated probabilities and a file size of each of the identified inactive data segments. The embodiment may further include generating a tiering list based on the calculated risk scores. The embodiment may also include automatically storing the detected data based on the generated tier list.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
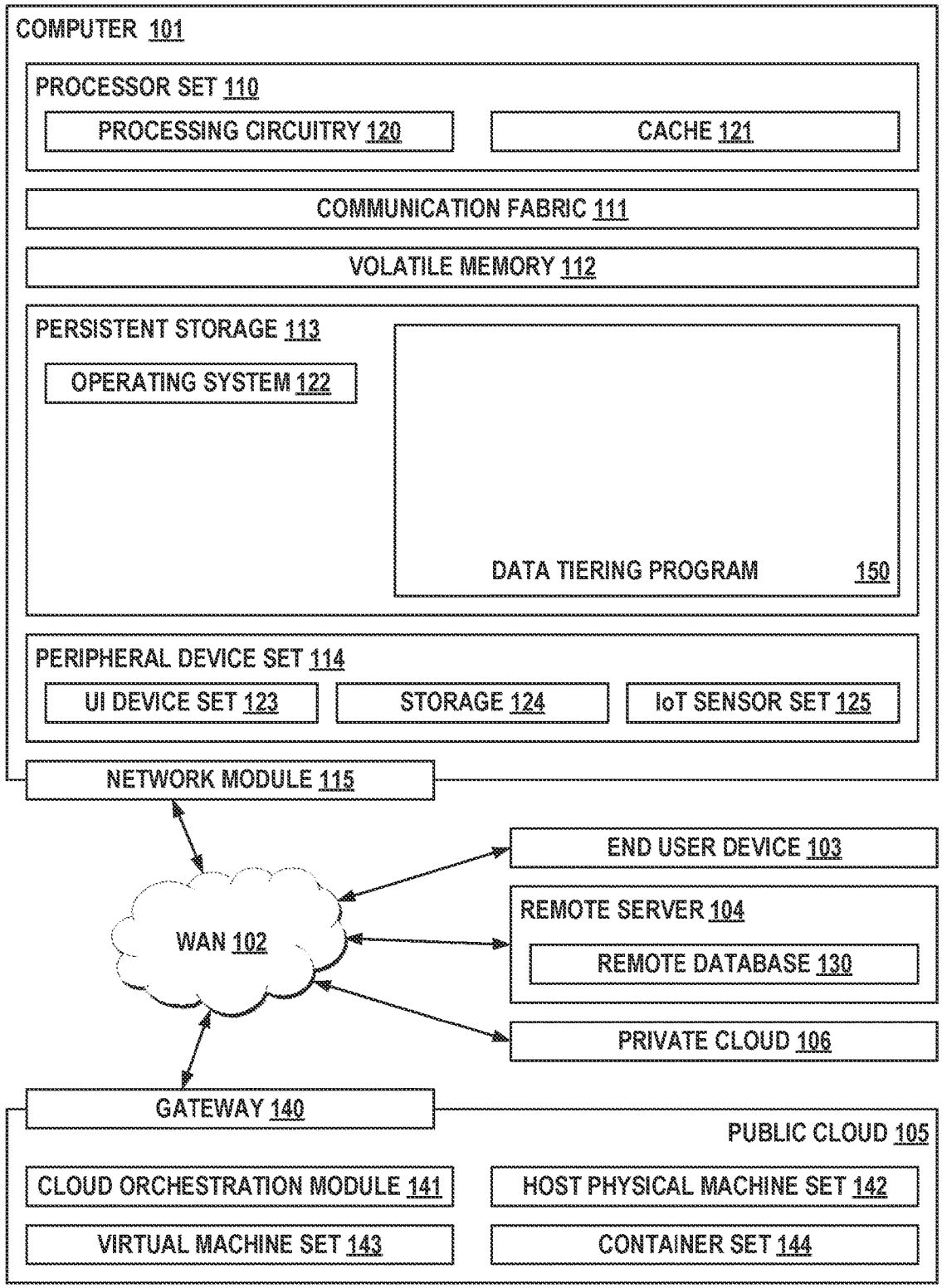
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to data storage, and more particularly, to cost-aware tiering for data storage. The following described exemplary embodiments provide a system, method, and program product to, among other things, detect data to be stored in one or more storage systems and gathering access and usage information for each data segment in the detected data, generate and maintain a first data structure, the first data structure including periods of activity below a defined threshold for the detected data, generate and maintain a common data structure to identify and track application-wide data patterns, gather static pricing information and context pricing information for the one or more storage systems, and calculate a tiering threshold corresponding to a continuous period of activity below a second defined threshold required for which local storage costs exceed a tiering cost. The following described exemplary embodiments may then identify inactive data segments within the detected data and calculate, for each of the identified inactive data segments, probabilities of the inactive data segments remaining inactive for a duration that exceeds the calculated tiering threshold, calculate a risk score for each of the identified inactive data segments based on the calculated probabilities and a file size of each of the identified inactive data segments, generate a tiering list based on the calculated risk scores, and automatically store the detected data based on the generated tier list. Therefore, the presently described embodiments have the capacity to improve data storage by tiering the detected data using predictive analytics to pro-actively sort or prioritize the detected data to be stored. Presently described embodiments may calculate a tiering threshold to determine which data should be stored within cheaper storage based on access and usage information for the data, pricing information related to the storage system being considered, and risk scores calculated using data segment inactivity probabilities and file size considerations. This allows presently described embodiments to generate a tiering list and automatically store (or send the tiering list to a suitable storing mechanism) the detected data in a more cost-efficient manner based on the generated tier list.

As previously described, many businesses must manage rapidly expanding volumes of data as computing power continues to increase over time. There are often multiple options for storing data, each having unique price points based on a variety of factors. To lower costs, many businesses attempt to employ hierarchical data storage solutions such that individual data segments may be stored within a suitably priced storage option depending on the importance of each individual data segment.

However, current practices for employing hierarchical data storage solutions by tiering individual data segments are flawed. For example, many data tiering solutions for data storage are rule or policy based. For instance, an exemplary data tiering solution may simply monitor data to identify data segments that have been inactive for 30 days, at which point the data segment will be tiered as 'cold' (inactive) and marked for storage within a relatively cheaper storage option. These types of rule or policy-based data tiering solutions may require waiting for data segments to become cold (inactive), increasing the cost associated with consumption of more expensive local storage options until inactivity of a data segment is established. Furthermore, rule or policy-based systems for data storage may identify data segments as cold or inactive just to have that same data segment be accessed shortly after being stored, resulting in excess access or usage costs.

Data segments which experience sporadic or infrequent access are not intelligently processed by current data tiering solutions. For these data segments, the optimal storage option may vary depending upon pricing of the available storage options and information related to the individual data segments. Being able to more intelligently tier data using predictive analytics before the data is stored would allow businesses to increase their storage cost savings.

Accordingly, a method, computer system, and computer program product for improving cost-aware tiering for data storage is provided. The method, system, and computer program product may detect data to be stored in one or more storage systems and gathering access and usage information for each data segment in the detected data. The method, system, computer program product may generate and maintain a first data structure, the first data structure including periods of activity below a defined threshold for the detected data. The method, system, computer program product may generate and maintain a common data structure to identify and track application-wide data patterns. The method, system, computer program product may gather static pricing information and context pricing information for the one or more storage systems. The method, system, computer program product may then calculate a tiering threshold corresponding to a continuous period of activity below a second defined threshold required for which local storage costs exceed a tiering cost. Then, the method, system, computer program product may identify inactive data segments within the detected data and calculate, for each of the identified inactive data segments, probabilities of the inactive data segments remaining inactive for a duration that exceeds the calculated tiering threshold. The method, system, computer program product may then calculate a risk score for each of the identified inactive data segments based on the calculated probabilities and a file size of each of the identified inactive data segments. Next, the method, system, computer program product may generate a tiering list based on the calculated risk scores. Thereafter, the method, system, computer program product may automatically store the detected data based on the generated tier list. In turn, the method, system, computer program product has provided for improved cost-aware tiering for data storage. Described embodiments have the capacity to improve data storage by tiering the detected data using predictive analytics to pro-actively sort or prioritize the detected data to be stored. Presently described embodiments may calculate a tiering threshold to determine which data should be stored within cheaper storage based on access and usage information for the data, pricing information related to the storage system being considered, and risk scores calculated using data segment inactivity probabilities and file size considerations. This allows presently described embodiments to generate a tiering list and automatically store (or send the tiering list to a suitable storing mechanism) the detected data in a more cost-efficient manner based on the generated tier list. This ensures that infrequently or sporadically accessed data segments, which may otherwise be stored in a non-optimal storage option if using a conventional tiering system, are stored in a most cost-effective storage option based upon the pricing information, access and usage information, and risk scores associated with each individual data segment.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as data tiering program/code 150. In addition to data tiering code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data tiering code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data tiering code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in data tiering code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the data tiering program 150 may be a program capable of detecting data to be stored in one or more storage systems and gathering access and usage information for each data segment in the detected data. Data tiering program 150 may generate and maintain a first data structure, the first data structure including periods of activity below a defined threshold for the detected data. Next, data tiering program 150 may generate and maintain a common data structure to identify and track application-wide data patterns. Data tiering program 150 may then gather static pricing information and context pricing information for the one or more storage systems. Next, data tiering program 150 may calculate a tiering threshold corresponding to a continuous period of activity below a second defined threshold required for which local storage costs exceed a tiering cost. Data tiering program 150 may then identify inactive data segments within the detected data and calculate, for each of the identified inactive data segments, probabilities of the inactive data segments remaining inactive for a duration that exceeds the calculated tiering threshold. Data tiering program 150 may then calculate a risk score for each of the identified inactive data segments based on the calculated probabilities and a file size of each of the identified inactive data segments. Next, data tiering program 150 may generate a tiering list based on the calculated risk scores. Thereafter, data tiering program 150 may automatically storing the detected data based on the generated tier list. Described embodiments thus provide for improved cost-aware tiering for data storage. Described embodiments have the capacity to improve data storage by tiering the detected data using predictive analytics to pro-actively sort or prioritize the detected data to be stored. Presently described embodiments may calculate a tiering threshold to determine which data should be stored within cheaper storage based on access and usage information for the data, pricing information related to the storage system being considered, and risk scores calculated using data segment inactivity probabilities and file size considerations. This allows presently described embodiments to generate a tiering list and automatically store (or send the tiering list to a suitable storing mechanism) the detected data in a more cost-efficient manner based on the generated tier list. This ensures that infrequently or sporadically accessed data segments, which may otherwise be stored in a non-optimal storage option if using a conventional tiering system, are stored in a most cost-effective storage option based upon the pricing information, access and usage information, and risk scores associated with each individual data segment.

Figure 2:
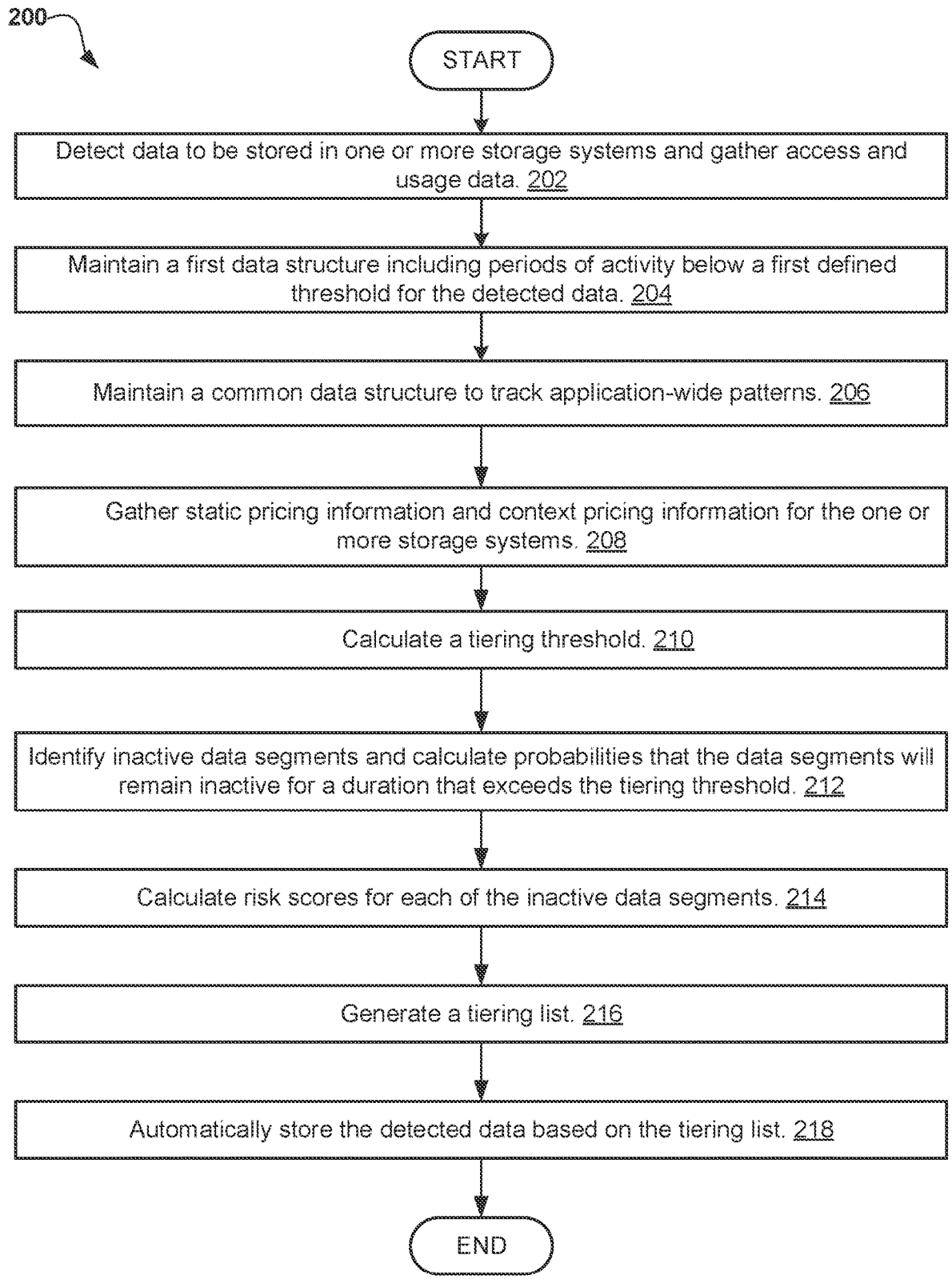
FIG. 2 illustrates an operational flowchart for a process of cost-aware tiering for data storage according to at least one embodiment.

Referring now to FIG. 2, an operational flowchart for an illustrative process 200 of cost-aware tiering for data storage according to at least one embodiment is provided.

Figure 3:
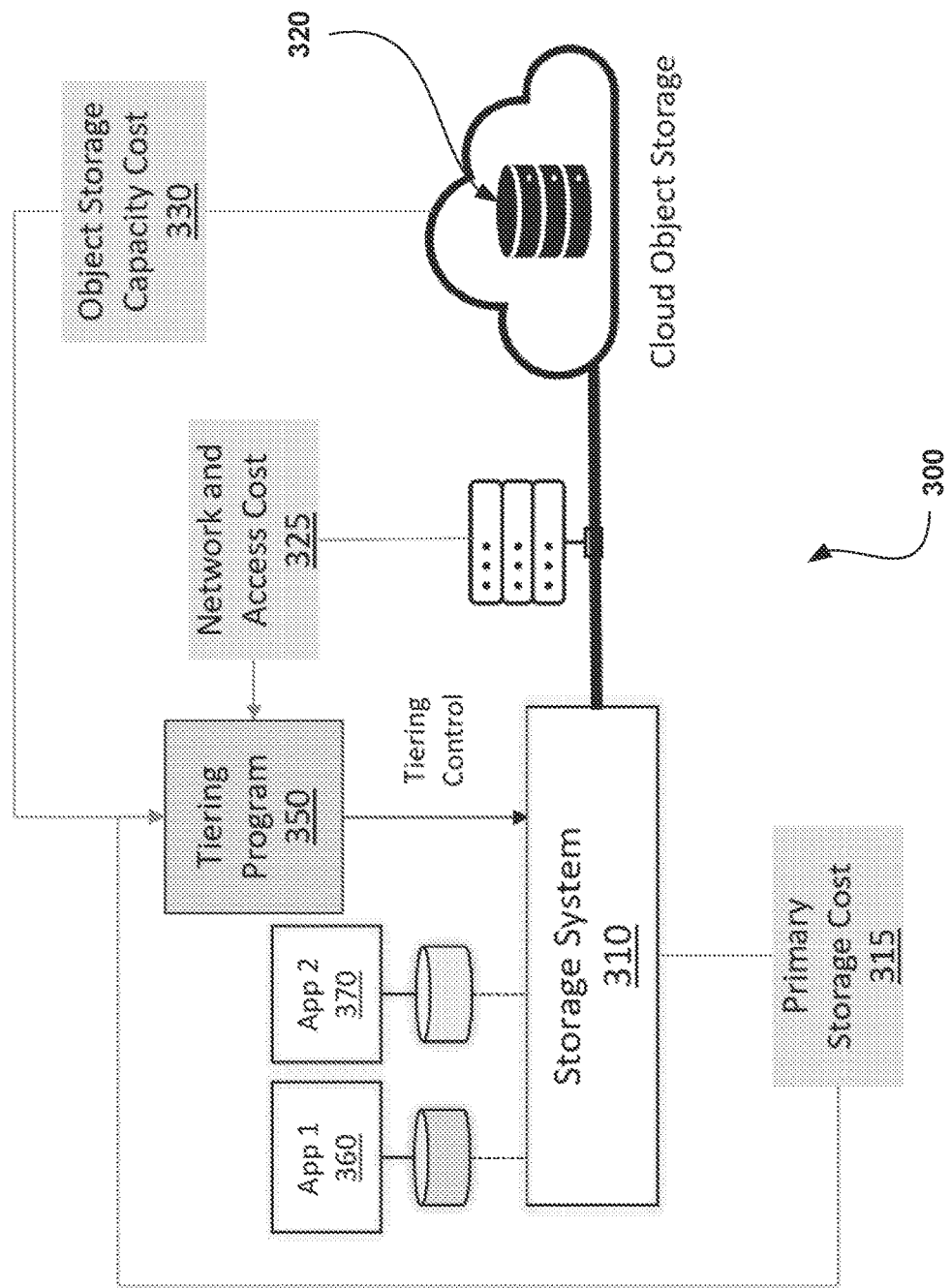
FIG. 3 depicts illustrative system architecture for an exemplary system configured to perform a process of cost-aware tiering for data storage according to at least one embodiment.

Illustrative process 200 may be performed using exemplary system architecture as shown in FIG. 3. In FIG. 3, an exemplary system 300 includes a storage system 310 including primary storage (not shown) and further including object storage 320, which in FIG. 3 includes cloud object storage. Object storage 320 corresponds to relatively cheaper storage suitable or inactive data segments, while primary storage corresponds to relatively more expensive storage (such as local high-performing storage). As shown, an exemplary tiering program 350 is configured to provide tiering control for data to be stored within storage system 310. Exemplary tiering program 350 may be further configured to consider primary storage costs 315, network and access costs 325 associated with the cloud object storage 320, and object storage capacity costs 330. Exemplary 'Application 1' at 360 and exemplary 'Application 2' at 370 are both deployed applications that output data to be stored within storage system 310. By employing illustrative process 200, exemplary tiering program 350 may utilize available cost data as well as access and usage information for the data segments being stored to employ predictive analytics to pro-actively tier the detected data to be stored in order to ensure an optimal storage option is used for each data segment. Illustrative process 200 for cost-aware tiering of storage data will now be described in greater detail below.

At 202, data tiering program 150 may detect data to be stored in one or more storage systems and gathering access and usage information for each data segment in the detected data. The one or more storage systems may include one or more devices, such as, for example, hard disk drives, solid state drives, memory, flash drives, network attached storage devices, magnetic tapes, cloud object storage devices, or any other suitable storage devices. In the context of this disclosure, object storage or cloud storage typically involves relatively cheaper storage, while primary storage refers to relatively more expensive storage options, such as local storage using hard disk drives or solid state drives. Detectable data may include files or data of any type and in any format. As shown in FIG. 3, in embodiments, data tiering program 150 may detect data originating from one or more deployed applications. Once data tiering program 150 has detected data to be stored in the one or more storage systems, it may gather access and usage information for each data segment contained in the detected data. For example, data tiering program 150 may gather access and usage data for an exemplary data segment 'File X' by periodically tracking the access of 'File X' using suitable file system capabilities such as 'atime', 'mtime', and 'ctime' to create a history of accesses, modifications, and changes respectively. The access and usage data may be time-stamped and gathered at periodic intervals. In embodiments, data tiering program 150 may be configured to continuously perform this step as new files are marked for storage and subsequently detected by data tiering program 150.

Next, at 204, data tiering program 150 may generate and maintain a first data structure, the first data structure including periods of activity below a defined threshold for the detected data. At this step, data tiering program 150 may utilize the periodically gathered access and usage information for each of the data segments to continuously build and update a first data structure using the time-stamped data to include periods of activity below a defined threshold for each of the data segments in the detected data. In embodiments, the first data structure may include periods of low or no activity for the detected data. For example, in some embodiments, the defined threshold may correspond to periods of activity in which data is never accessed. In other embodiments, the defined threshold may correspond to periods of activity for the detected data in which the detected data is accessed infrequently as compared to other data originating from the same source, or similar data being stored within the same storage system(s). In embodiments the defined threshold may be predetermined and input manually by a user. In other embodiments, data tiering program 150 may be configured to determine the defined threshold based on historical data such that the determined defined threshold corresponds to a historical amount of infrequent activity corresponding to a calculated tiering threshold for previously detected similar data. The calculated tiering threshold is described in greater detail below in connection with step 210 of process 200.

At 206, data tiering program 150 may generate and maintain a common data structure to identify and track application-wide data patterns. At this step, data tiering program 150 may add the periods of activity below a defined threshold for the data segments into a common data structure to identify and track data patterns across one or more applications. In embodiments, data tiering program 150 may utilize the common data structure to better characterize and tier newly added data segments for which there would be no historical access or usage data. For example, at this step data tiering program 150 may maintain a common data structure that demonstrates a trend for files of an exemplary type 'A' that are accessed on the day of file creation but experience periods of no activity thereafter, as they are not accessed or used. This application-wide data pattern for files of type 'A' may be used by data tiering program 150 during later steps of process 200 (described in greater detail below) to characterize and tier newly added data segments.

At 208, data tiering program 150 may gather static pricing information and context pricing information for the one or more storage systems. Many businesses will store hot (active) data that is highly accessed and used in local or relatively expensive storage that may having increased performance, while storing cold (inactive) data on cheaper storage. However, there is typically a cost associated with accessing cold data after it has been stored within a relatively cheap storage option. For example, returning to the illustrative embodiment shown in FIG. 3, a business may employ an exemplary data tiering program 350 that tiers and subsequently stores cold data in storage system 310 by sending and storing the cold data within a cloud object storage 320 provided by a third party for a relatively cheap price. However, when the business needs to access that stored cold data, it must pay network and access costs 325. Using the same example, data tiering program 350 may tier and subsequently store hot data in storage system 310 by sending and storing the hot data within a primary storage device, such as a solid state drive, that is local and relatively expensive for the business to purchase and maintain. In order to properly tier and subsequently store the data, data tiering program 150 must consider the pricing information for all storage options.

In the context of this disclosure, static pricing information refers to unchanging rates or prices associated with the one or more storage systems being considered for use. Data tiering program 150 may consider a variety of factors when gathering static pricing information for the one or more storage options, such as, for example, data access costs, data storage costs, and bandwidth costs. Next, data tiering program 150 may gather context aware pricing information. In the context of this disclosure, context aware pricing information refers to rates or prices for the available storage options that change based on circumstances and context. Context aware pricing information may include, for example, the amount of data already stored within a given storage option or the number of accesses for a given data segment stored in a given storage option within a billing period. Context aware pricing information is always changing and may influence the value proposition for storing a given data segment within a given storage option, as will be calculated by data tiering program 150 in subsequent steps.

Next, at 210, data tiering program 150 may calculate a tiering threshold corresponding to a continuous period of activity below a second defined threshold required for which local storage costs exceed a tiering cost. In the context of this disclosure, 'tiering cost' refers to the cost of storing data within a relatively cheaper available storage option after marking the data as 'cold' or 'cool' based on infrequent or sporadic access or usage. Data tiering program 150 accomplishes this by considering the above-described static pricing information and context aware pricing information to calculate a duration of time that data would have to be inactive, or rarely active, to ensure that the cost of utilizing available local storage (primary storage having a relatively high cost) would exceed the cost of tiering the data and subsequently storing it in relatively cheap available storage. Accordingly, the second defined threshold corresponds to an upper limit of activity or accesses that may be observed for a given data segment that would make that data segment suitable for cost-effective storage in a cheaper storage option. Once the activity for a given data segment exceeds the second defined threshold, the cost of local storage will no longer exceed the considered cheaper storage options, indicating that the given data segment should be stored locally and not tiered. Data tiering program 150 may calculate the second defined threshold based on the above-described static pricing information and context aware pricing information for available storage options, thus determining the number of accesses allowable to make the cheaper storage option cost efficient. Data tiering program 150 may further be configured to utilize a preconfigured cost model capable of processing the above-described information and factors to calculate the tiering threshold based on the static pricing information and the context aware pricing information associated with available storage options, as well as the second defined threshold. Returning to the example of FIG. 3, at this step exemplary data tiering program 350 would consider all relevant static pricing information and context pricing information for the available storage options (both primary local storage and cheap storage) to calculate a duration of inactivity required for which the cost of storing data within relatively expensive primary storage would exceed the cost of storing the data within cloud object storage 320, a relatively cheaper storage option. If for example, data tiering program 350 calculates a tiering threshold of 5 days, then data tiering program 350 has calculated that, for the available storage options being considered (based on static pricing information and context pricing information), it becomes cost efficient after 5 days of the data segment being considered having an activity level below the second defined threshold to tier the associated files and store them within relatively cheaper storage options. If the data segment was instead inactive for a time period less than 5 days and had an activity level exceeding the second defined threshold, then the tiering threshold is not exceeded and it would not be cost effective to store the data within the cheaper storage option.

At 212, data tiering program 150 may identify inactive data segments within the detected data and calculating, for each of the identified inactive data segments, probabilities of the inactive data segments remaining inactive for a duration that exceeds the calculated tiering threshold. Data tiering program 150 may perform this step for each data segment within the detected data. For example, at this step data tiering program 150 may identify that an exemplary data segment 'File 1' has been inactive for a duration of 3 days. If data tiering program 350 calculated a tiering threshold for the available storage options of 5 days, then at this step, data tiering program 350 would calculate a probability that 'File' 1 will remain inactive for a duration that exceeds 5 days. In other words, data tiering program 350 is attempting to predict the likelihood that it will be cost-effective to store 'File 1' within a relatively cheaper storage option using predictive analysis based on the calculated tiering threshold. To calculate the probability of remaining inactive (sometimes referred to herein as an 'inactivity probability') for a given data segment, data tiering program 150 may utilize historical inactivity information contained within the first data structure discussed above at step 204. In embodiments the calculated risk may be represented numerically as a percentage between 0 and 100 percent. For example, data tiering program 150 may be configured to utilize a formula to calculate that a given data segment has a 95 percent chance of remaining inactive for a duration that exceeds the tiering threshold based upon inputting historical data into the formula that and obtaining results indicating that the given data segment remained inactive for more than 5 days in the past 90 out of 100 past times or observation periods.

In embodiments, data tiering program 150 may detect newly added files for which it must calculate an inactivity probability. In this instance, data tiering program 150 may calculate an inactivity probability by utilizing the common data structure discussed above at step 206 to calculate the inactivity probability for a newly added file based on application-wide patterns for given data segment types to determine the probability that the newly added files will remain inactive for a duration that exceeds the tiering threshold.

Next, at 214, data tiering program 150 may calculate a risk score for each of the identified inactive data segments based on the calculated probabilities and a file size of each of the identified inactive data segments. While the calculated inactivity probabilities described at step 212 are highly useful datapoints regarding the cost-effectiveness of storing a given data segment within a relatively cheaper storage option, data tiering program 150 is configured to further consider the fiscal downside (risk) of an inactive file having to be accessed (possibly frequently) after being stored within a relatively cheaper storage option. This described risk or potential cost may be reflected by data tiering program 150 within a calculated risk score for each data segment. The risk score may be calculated using a formula that includes both the calculated probabilities from step 212 and size of the data segment being considered. This is because the costs associated with unexpected access or usage of relatively larger sized files is typically higher than relatively smaller sized files. Accordingly, data tiering program 150 may calculate a higher risk score for a relatively larger sized data segment as compared to a relatively smaller sized data segment having the same calculated inactivity probability. This reflects the increased risk from a cost perspective associated with the larger sized data segment that would be experienced in the event of unexpected usage or access of the data segment after storage. In embodiments, the calculated risk score may be represented numerically as a number between 1 and 10, where a relatively lower number closer to 1 indicates a relatively lower risk and a relatively higher number closer to 10 indicates a relatively higher risk.

At 216, data tiering program may generate a tiering list based on the calculated risk scores. The tiering list may identify cost-effective storage options for the detected data, listing each individual data segment ordered by the calculated risk score. In embodiments, data tiering program 150 may be configured to sort data within the generated tiering list using a series of pre-configured risk score thresholds. For example, in embodiments, data tiering program 150 may be configured to generate a tier list indicating that any data segment having a risk score greater than or equal to 5 should be stored within relatively costly primary storage, while all data segments having a risk score of less than 5 should be tiered as 'cooler' or 'cold' data that would be more appropriately stored within relatively cheaper storage options. In other embodiments data tiering program 150 may generate a tiering list that tiers the data using preconfigured data portions represented as percentages. For example, data tiering program 150 may tier the bottom 30 percent of the data having the lowest risk scores for storing within a relatively cheapest storage option, while a middle 40 percent may be tiered for storage within a somewhat cheap storage option, while the top 30 percent of data having the highest risk scores may be stored within local or primary storage having a relatively high storage cost. Data tiering program 150 may be configured to sort the generated tiering list by any suitable or desirable means that utilizes the calculated risk scores to tier the data and recommend subsequent storage options as may be desired by a given user.

Lastly, at 218, data tiering program 150 may automatically store the detected data based on the generated tier list. In embodiments, data tiering program 150 may have direct access to the one or more storage systems and may be configured to store the data segments within appropriate storage options based on the tiering list generated at step 216. In other embodiments, data tiering program 150 may be configured to store the detected data based on the generated tiering list by communicating the information of the generated tiering list to any suitable storage mechanism having direct access to the storage options to be utilized.

It will be appreciated that data tiering program 150 thus provides for improved cost-aware tiering for data storage. Described embodiments have the capacity to improve data storage by tiering the detected data using predictive analytics to pro-actively sort or prioritize the detected data to be stored. Presently described embodiments may calculate a tiering threshold to determine which data should be stored within cheaper storage based on access and usage information for the data, pricing information related to the storage system being considered, and risk scores calculated using data segment inactivity probabilities and file size considerations. This allows presently described embodiments to generate a tiering list including the calculated risk scores to ensure the detected data is stored in a cost-efficient storage option based on the generated tier list. This ensures that infrequently or sporadically accessed data segments, which may otherwise be stored in a non-optimal storage option if using a conventional tiering system, are stored in a most cost-effective storage option.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of cost-aware tiering for data storage comprising:

detecting data to be stored in one or more storage systems and gathering access and usage information for each data segment in the detected data;

generating and maintaining a first data structure, the first data structure including periods of activity below a defined threshold for the detected data;

generating and maintaining a common data structure to identify and track application-wide data patterns;

gathering static pricing information and context pricing information for the one or more storage systems;

calculating a tiering threshold corresponding to a continuous period of activity below a second defined threshold required for which local storage costs exceed a tiering cost;

identifying inactive data segments within the detected data and calculating, for each of the identified inactive data segments, probabilities of the inactive data segments remaining inactive for a duration that exceeds the calculated tiering threshold;

calculating a risk score for each of the identified inactive data segments based on the calculated probabilities and a file size of each of the identified inactive data segments;

generating a tiering list based on the calculated risk scores; and automatically storing the detected data based on the generated tier list.

2. The computer-based method of claim 1 further comprising:

detecting newly added files; and in response to detecting the newly added files, referring to the common data structure to calculate, for each of the newly added files, a second probability of the newly added files remaining inactive for the duration that exceeds the calculated tiering threshold.

3. The computer-based method of claim 1, wherein the static pricing information comprises one or more of data access costs, data storage costs, and bandwidth costs for each of the one or more storage options.

4. The computer-based method of claim 1, wherein the context pricing information comprises an amount of tiered data stored within each of the one or more storage options, and a number of instances of access and usage within a billing period for each of the one or more storage options.

5. The computer-based method of claim 1, wherein the tiering threshold is calculated using a preconfigured cost model.

6. The computer-based method of claim 1, wherein the detected data is derived from one or more deployed applications.

7. The computer-based method of claim 1, wherein the one or more storage systems comprises one or more of hard disk drives, solid state drives, memory, flash drives, network attached storage devices, magnetic tapes, and cloud object storage devices.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

detecting data to be stored in one or more storage systems and gathering access and usage information for each data segment in the detected data;

generating and maintaining a first data structure, the first data structure including periods of activity below a defined threshold for the detected data;

generating and maintaining a common data structure to identify and track application-wide data patterns;

gathering static pricing information and context pricing information for the one or more storage systems;

calculating a tiering threshold corresponding to a continuous period of activity below a second defined threshold required for which local storage costs exceed a tiering cost;

identifying inactive data segments within the detected data and calculating, for each of the identified inactive data segments, probabilities of the inactive data segments remaining inactive for a duration that exceeds the calculated tiering threshold;

calculating a risk score for each of the identified inactive data segments based on the calculated probabilities and a file size of each of the identified inactive data segments;

generating a tiering list based on the calculated risk scores; and automatically storing the detected data based on the generated tier list.

9. The computer system of claim 8, further comprising:

detecting newly added files; and in response to detecting the newly added files, referring to the common data structure to calculate, for each of the newly added files, a second probability of the newly added files remaining inactive for the duration that exceeds the calculated tiering threshold.

10. The computer system of claim 8, wherein the static pricing information comprises one or more of data access costs, data storage costs, and bandwidth costs for each of the one or more storage options.

11. The computer system of claim 8, wherein the context pricing information comprises an amount of tiered data stored within each of the one or more storage options, and a number of instances of access or usage within a billing period for each of the one and more storage options.

12. The computer system of claim 8, wherein the tiering threshold is calculated using a preconfigured cost model.

13. The computer system of claim 8, wherein the detected data is derived from one or more deployed applications.

14. The computer system of claim 8, wherein the one or more storage systems comprises one or more of hard disk drives, solid state drives, memory, flash drives, network attached storage devices, magnetic tapes, and cloud object storage devices.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

detecting data to be stored in one or more storage systems and gathering access and usage information for each data segment in the detected data;

generating and maintaining a first data structure, the first data structure including periods of activity below a defined threshold for the detected data;

generating and maintaining a common data structure to identify and track application-wide data patterns;

gathering static pricing information and context pricing information for the one or more storage systems;

calculating a tiering threshold corresponding to a continuous period of activity below a second defined threshold required for which local storage costs exceed a tiering cost;

identifying inactive data segments within the detected data and calculating, for each of the identified inactive data segments, probabilities of the inactive data segments remaining inactive for a duration that exceeds the calculated tiering threshold;

calculating a risk score for each of the identified inactive data segments based on the calculated probabilities and a file size of each of the identified inactive data segments;

generating a tiering list based on the calculated risk scores; and automatically storing the detected data based on the generated tier list.

16. The computer program product of claim 15, further comprising:
- detecting newly added files; and
- in response to detecting the newly added files, referring to the common data structure to calculate, for each of the newly added files, a second probability of the newly added files remaining inactive for the duration that exceeds the calculated tiering threshold.

17. The computer program product of claim 15, wherein the static pricing information comprises one or more of data access costs, data storage costs, and bandwidth costs for each of the one or more storage options.

18. The computer program product of claim 15, wherein the context pricing information comprises an amount of tiered data stored within each of the one or more storage options, and a number of instances of access and usage within a billing period for each of the one or more storage options.

19. The computer program product of claim 15, wherein the tiering threshold is calculated using a preconfigured cost model.

20. The computer program product of claim 15, wherein the one or more storage systems comprises one or more of hard disk drives, solid state drives, memory, flash drives, network attached storage devices, magnetic tapes, and cloud object storage devices.

* * * * *